United States Patent
Betensky

[11] 3,942,875
[45] Mar. 9, 1976

[54] WIDE APERTURE LONG FOCAL LENGTH LENS

[75] Inventor: Ellis I. Betensky, Toronto, Canada

[73] Assignee: Ponder & Best, Inc., Santa Monica, Calif.

[22] Filed: May 9, 1974

[21] Appl. No.: 468,472

Related U.S. Application Data

[63] Continuation-in-part of Ser. No. 286,920, Sept. 7, 1972, abandoned, which is a continuation-in-part of Ser. No. 179,304, Sept. 10, 1971, abandoned.

[52] U.S. Cl. ................ 350/214; 350/176; 350/216
[51] Int. Cl.² ...................... G02B 9/64; G02B 1/00
[58] Field of Search .......... 350/214, 215, 216, 217, 350/218, 219, 255, 176

[56] References Cited
UNITED STATES PATENTS

| | | |
|---|---|---|
| 2,528,212 | 10/1950 | Cook ................................. 350/219 |
| 2,604,013 | 7/1952 | Schade ............................. 350/216 X |
| 3,183,813 | 5/1965 | Wohner et al. .................. 350/255 X |
| 3,524,700 | 8/1970 | Eggert et al. ....................... 350/218 |
| 3,612,661 | 10/1971 | Determann et al. ............ 350/2T9 X |
| 3,815,974 | 6/1974 | Momiyama ..................... 350/255 X |

Primary Examiner—Paul A. Sacher
Attorney, Agent, or Firm—DeLio and Montgomery

[57] ABSTRACT

A wide aperture long focus photographic lens having internal aberration compensation and comprising an objective which is movable for focusing and a rear lens which is stationary with respect to the film plane and has an equivalent focal length which is substantially longer than the equivalent focal length of the overall lens.

5 Claims, 10 Drawing Figures

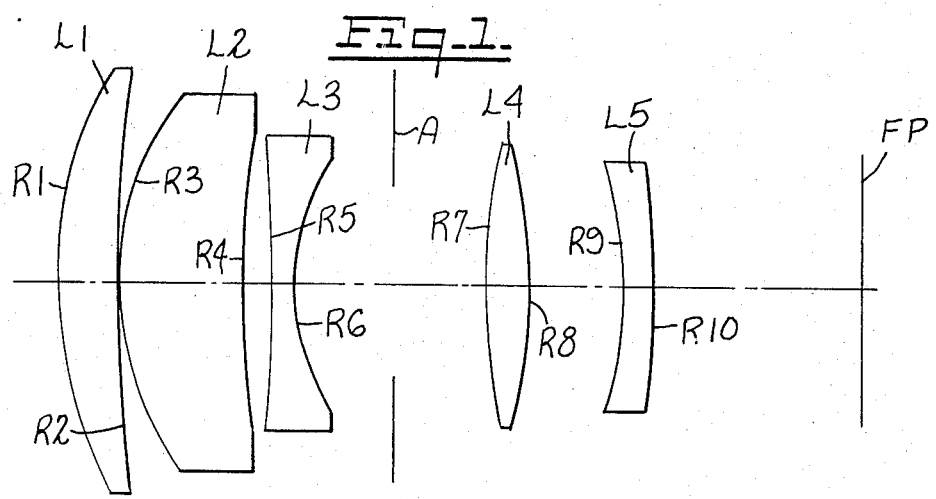
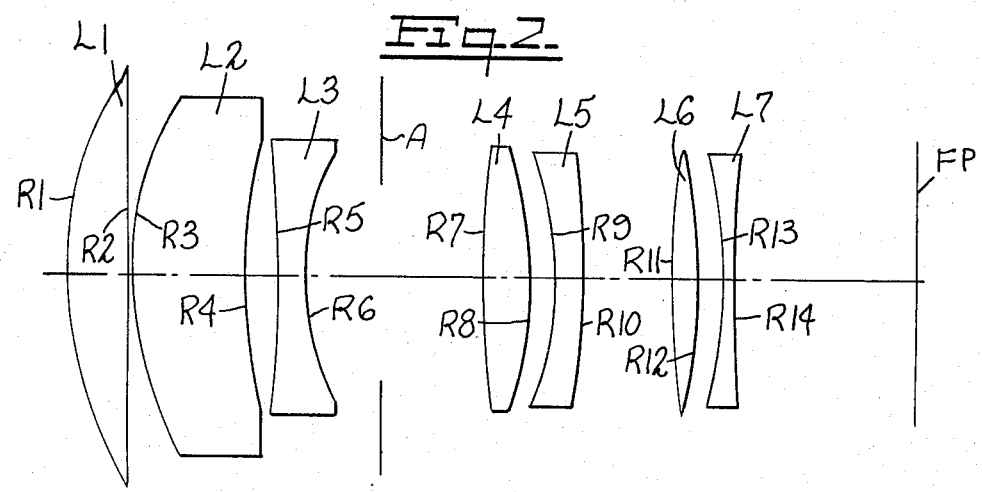
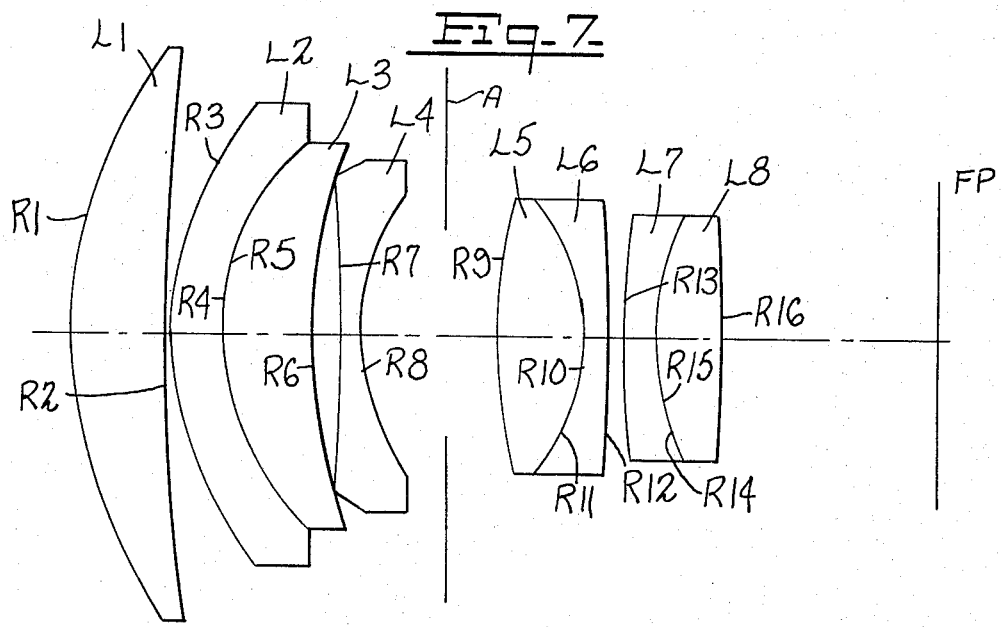

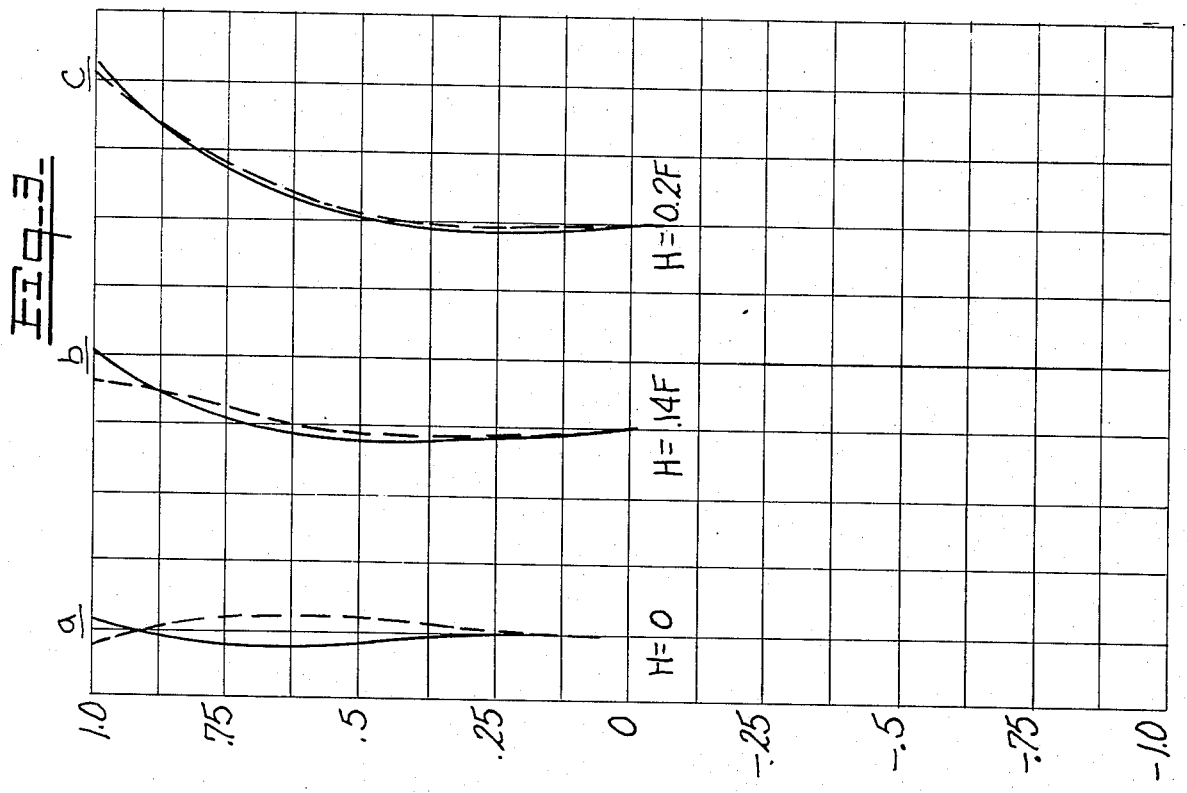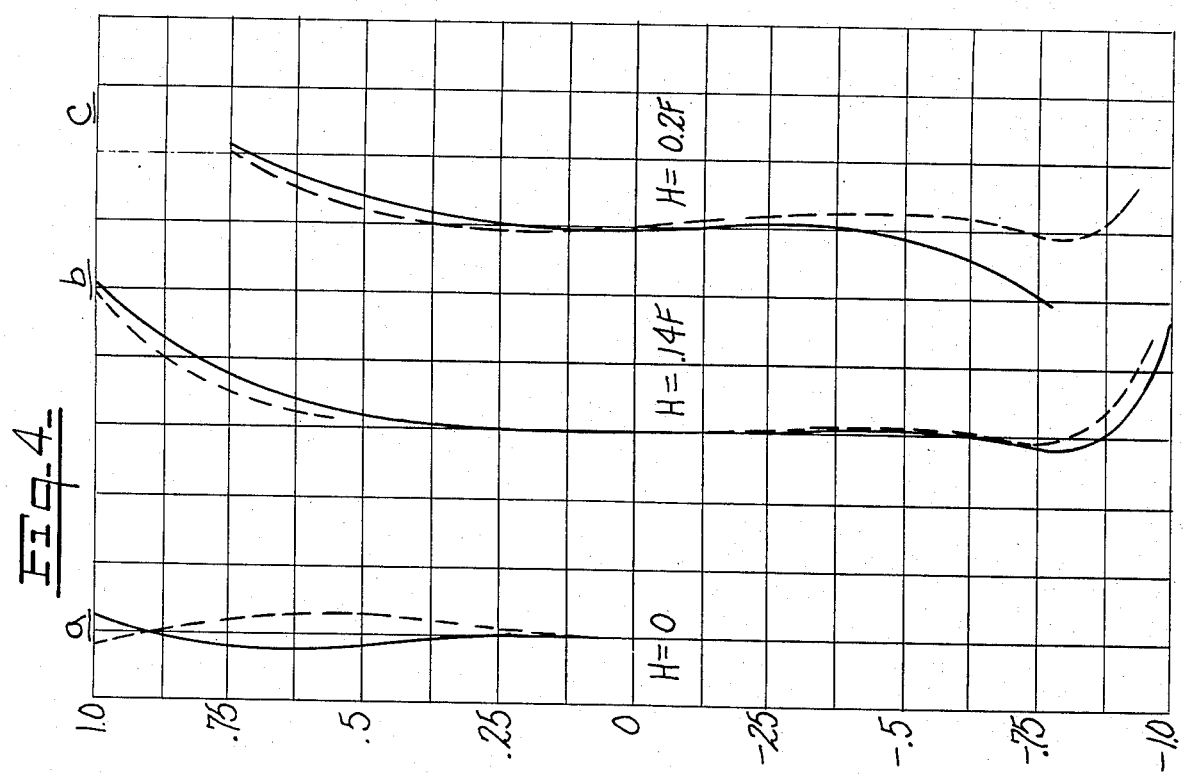

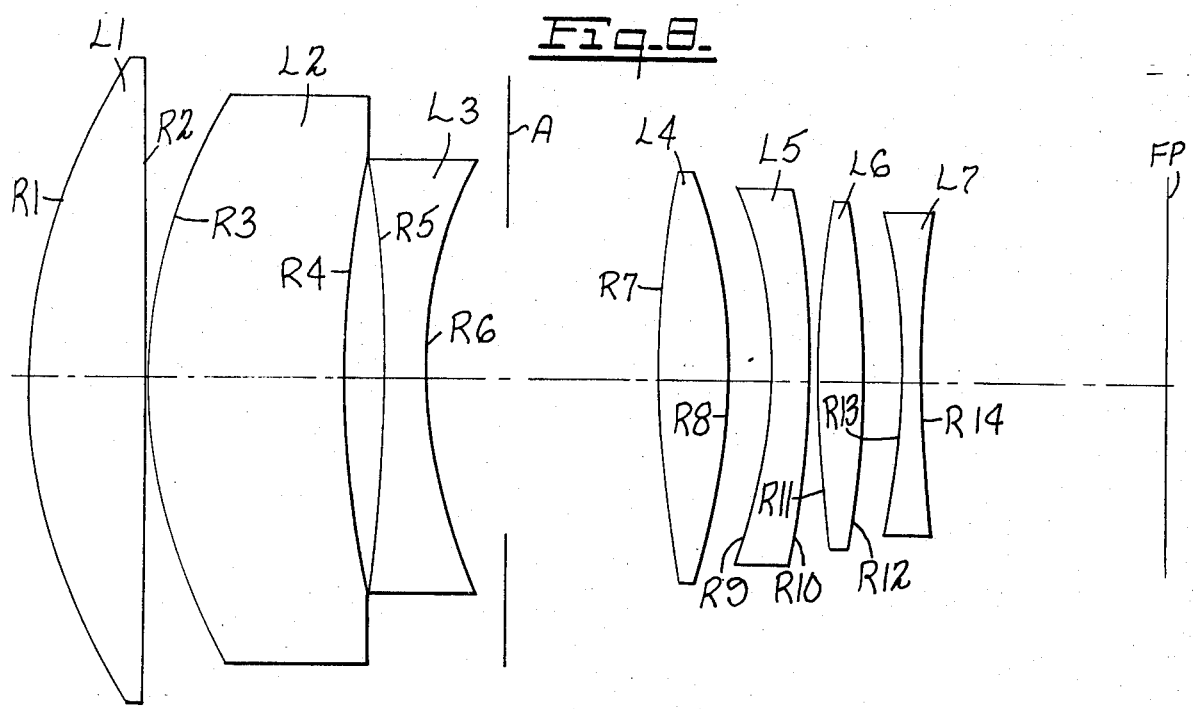
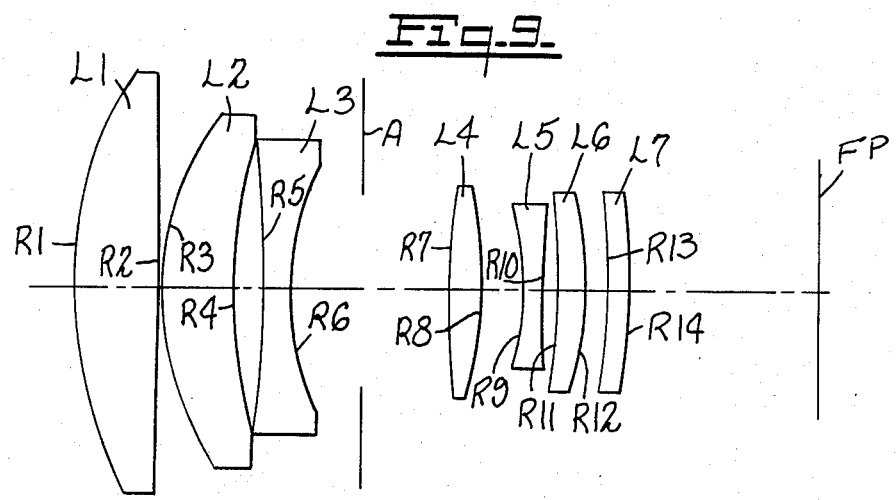
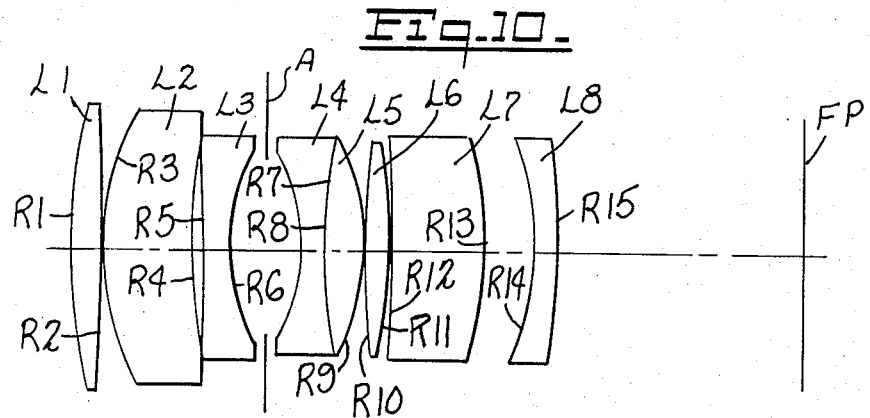

WIDE APERTURE LONG FOCAL LENGTH LENS

This application is a continuation-in-part of copending application Ser. No. 286,920, filed Sept. 7, 1972, which was a continuation-in-part of and copending with Ser. No. 179,304, filed Sept. 10, 1971, both now abandoned.

This invention relates to photographic lenses, and more particularly relates to lens of relatively long focal lengths and large relative aperture which may be focused to very close objects.

A difficulty presented in focusing camera lenses to close subjects on the order of ten to twelve equivalent focal length (EFL) distance is resulting poor image quality.

The change of aberration correction as a function of object distance or magnification change is a complicated function which increases rapidly with increased power (decreased focal length) of the components, and greater relative aperture of the lens.

The degradation in image quality as function of magnification or focusing distance varies from one lens type to another. If a long focal length lens design is optimized for a given distance the image quality at a substantially shorter distance will be greatly degraded, and if a closer object distance were required, image quality could degenerate to the point of being unacceptable even for novel use.

Ordinarily, various lens types are optimized for a predetermined object distance. When the objective is moved for focusing, the spherical aberration or axial imagery will not change significantly. However, as the lens is focused closer, the off-axis imagery will change significantly, and can degenerate to the point of being unacceptable even for novel use.

The present invention provides a lens structure which overcomes the aforementioned problem and permits relatively long focal length lens of large relative aperture to be focused more closely without significant degradation of the off-axis imagery. The term "long focal length" as used herein refers to lenses whose equivalent focal length is one and one-half or more times greater than the diagonal of the image frame of the camera with which it is used.

This is achieved by providing a lens type using a relatively long focal length lens at a fixed position with reference to the film plane. Then, as the lens is focused, only the foremost portion of the lens moves while the rear component remains fixed with respect to the film. The correction lens is selected to be of essentially zero power.

In such an arrangement, with the rear lens element fixed in location to the film plane, when the front elements are moved, the spherical aberration or axial imagery will not change significantly. The off-axis imagery, however, would ordinarily change significantly. With the proper design of the rear group, the change will have a compensating effect to that which would normally occur without the correcting element, without significant degradation of the on-axis imagery.

An object of this invention is to provide a new and improved photographic lens of relatively long EFL and wide relative aperture.

Another object of this invention is to provide a new and improve lens structure for correcting off-axis aberration while allowing closer focusing of the lens with respect to an object to be photographed.

The features of the invention which are believed to be novel are particularly pointed out and distinctly claimed in the concluding portion of this specification. However, the invention both as to its operation and organization together with further objects and advantages thereof may best be appreciated by reference to the following detailed description taken in conjunction with the drawings, wherein:

FIG. 1 is a lens representation of a five element, 100mm f/1.9 lens representative of the prior art.

FIG. 2 is a lens representation of a five element objective 100mm f/1.9 lens which also includes a doublet aberration corrector;

FIG. 3 is a graphical comparison of aberration in the lenses of FIGS. 1 and 2 due to sagittal rays with the object at infinity, and for different object heights.

FIG. 4 is a graphical comparison of aberration in the lenses of FIGS. 1 and 2 due to tangential rays with the object at infinity, and for different object heights;

FIG. 7 is a lens representation of a 100mm f/1.8 lens with a cemented doublet aberration corrector element.

FIG. 8 is a representation of a 100mm f/1.9 lens with an air spaced doublet aberration correction lens;

FIG. 9 is a representation of a 135mm f/2.0 lens with an air spaced doublet correction lens;

FIG. 10 is a representation of a 90mm f/1.9 macro lens with an air spaced doublet correction lens;

Figure 5:
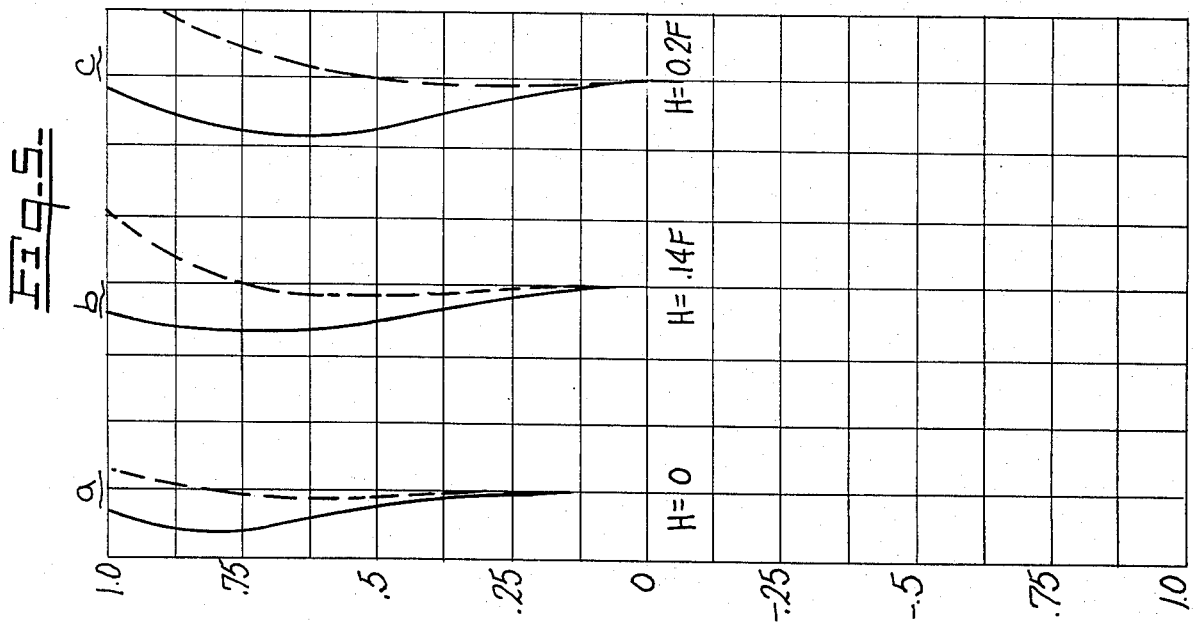
FIG. 5 is a graphical representation in aberration in the lenses of FIGS. 1 and 2 due to sagittal rays with the object at 10 focal lengths for different object heights.

The lenses hereinafter disclosed are of relatively wide aperture, at least $f/2.0$ and have equivalent focal lengths (EFL's) of from 1.5 to 3.0, the EFL's of the common 35mm single lens of reflex camera lenses (generally 50–58mm). Stated in another manner, the EFL's of the lenses of this invention to the diagonal D of the image frame (24 × 36mm) are from 1.50 to 3.00. All lenses for single lens reflex cameras have a back focal length (BFL) which is at least 0.90D. The corrector lens group which may be an air spaced or cemented doublet has an EFL which is eight times the EFL of the overall lens. Otherwise stated, the power of the corrector group is essentially zero with respect to the overall lens.

In all of the lenses disclosed, the front objective elements move for focusing while the real corrector group remains fixed with respect to the film plane (FP). Mechanism for achieving this focusing motion is disclosed in copending application Ser. No. 468,473, filed on the same day as this application.

To exhibit the improvement derived through use of the invention, comparative tests were made on a 100mm $f/1.9$, five element objective lens for a 24 × 36mm image frame camera with and without the aberration correction lens element. The lens of FIG. 1 without the aberration correction was design optimized for best performance. The lens of FIG. 2 embodies an air spaced doublet corrector in accordance with the invention.

The parameters of the lens with reference to FIGS. 1 and 2 with and without corrector are given in Tables I and II, respectively:

TABLE I

100mm f/1.9 Lens (FIG. 1)

| Lens | | Radius | Axial Distance Between Surfaces | $N_d$ | $V_d$ |
|---|---|---|---|---|---|
| L1 | $R_1 =$ | 51.593 | | | |
|  |  |  | 8.000 | 1.589 | 61.3 |
|  | $R_2 =$ | 249.766 | | | |
|  |  |  | 0.100 | | |
| L2 | $R_3 =$ | 41.335 | | | |
|  |  |  | 15.463 | 1.517 | 64.2 |
|  | $R_4 =$ | 165.323 | | | |
|  |  |  | 3.384 | | |
| L3 | $R_5 =$ | −199.985 | | | |
|  |  |  | 3.000 | 1.728 | 28.4 |
|  | $R_6 =$ | 30.244 | | | |
|  |  |  | 23.427 | | |
| L4 | $R_7 =$ | 74.865 | | | |
|  |  |  | 5.777 | 1.834 | 37.2 |
|  | $R_8 =$ | 60.832 | | | |
|  |  |  | 11.625 | | |
| L5 | $R_9 =$ | 44.268 | | | |
|  |  |  | 3.129 | 1.805 | 25.4 |
|  | $R_{10} =$ | −211.080 | | | |
|  |  |  | 39.012 | | |
| Film Plane | | | | | |

Front Vertex Distance = 112.917mm

FIG. 2 shows a lens of 100mm f/1.9 scaled for 24 × 36mm image frame. The data of this lens is set forth in Table II.

TABLE II

100mm f/1.9 Lens (FIG. 2)

| Lens | | Radius | Axial Distance Between Surfaces | $N_d$ | $V_d$ |
|---|---|---|---|---|---|
| L1 | $R_1 =$ | 44.903 | | | |
|  |  |  | 9.000 | 1.589 | 61.0 |
|  | $R_2 =$ | 1037.300 | | | |
|  |  |  | .250 | | |
| L2 | $R_3 =$ | 41.385 | | | |
|  |  |  | 14.284 | 1.516 | 64.0 |
|  | $R_4 =$ | 63.742 | | | |
|  |  |  | 3.500 | | |
| L3 | $R_5 =$ | −149.9080 | | | |
|  |  |  | 3.000 | 1.755 | 27.5 |
|  | $R_6 =$ | 31.213 | | | |
|  |  |  | 19.599 | | |
| L4 | $R_7 =$ | 80.786 | | | |
|  |  |  | 5.777 | 1.750 | 35.0 |
|  | $R_8 =$ | −47.302 | | | |
|  |  |  | 4.543 | | |
| L5 | $R_9 =$ | −42.907 | | | |
|  |  |  | 2.700 | 1.755 | 27.5 |
|  | $R_{10} =$ | −120.985 | | | |
|  |  |  | 1.000 | | |
| L6 | $R_{11} =$ | 119.884 | | | |
|  |  |  | 3.500 | 1.740 | 28.2 |
|  | $R_{12} =$ | 71.346 | | | |
|  |  |  | 2.436 | | |
| L7 | $R_{13} =$ | −61.984 | | | |
|  |  |  | 1.600 | 1.785 | 25.6 |
|  | $R_{14} =$ | 166.988 | | | |
|  |  |  | 40.5 | | |
| Film Plane | | | | | |

Front Vertex Distance = 111.689

$N_d$ is the coefficient of refraction and $V_d$ is the Abbe number.

The back focal length of the overall lens of FIG. 2 is 40.5mm. The focal length of the doublet corrector comprising elements L6 and L7 is 65921mm or essentially infinite. The space between elements L3 and L4 varies from 100 − 32.00mm for focusing at infinity to 605.7mm, about 6 EFL's or less than 2.4 feet. Where the image frame is 24 × 36mm, as in the common 35mm camera, it may easily be seen that this satisfies the requirements previously set forth that BFL = 0.9D and the power of the corrector is essentially zero.

The elements L1 – L5 move in fixed relation with each other for focusing while corrector elements L6 and L7 are in fixed relation to the film plane FP.

FIGS. 3 and 4 show a comparison of the aberration in the lenses of FIGS. 1 and 2 with the object at infinity for image heights (H) of 0; 0.14F; and 0.2F where F = EFL. The abscissa divisions are 0.005F and the ordinates are the relative entrance pupil height of the lens.

FIG. 3 shows the lateral aberration due to sagittal rays and FIG. 4 shows the lateral aberration due to tangential rays. The broken line represents the aberration of the lens of FIG. 2 with the corrector elements, and the solid line represents the aberration of the lens of FIG. 1 without the corrector element.

Figure 6:
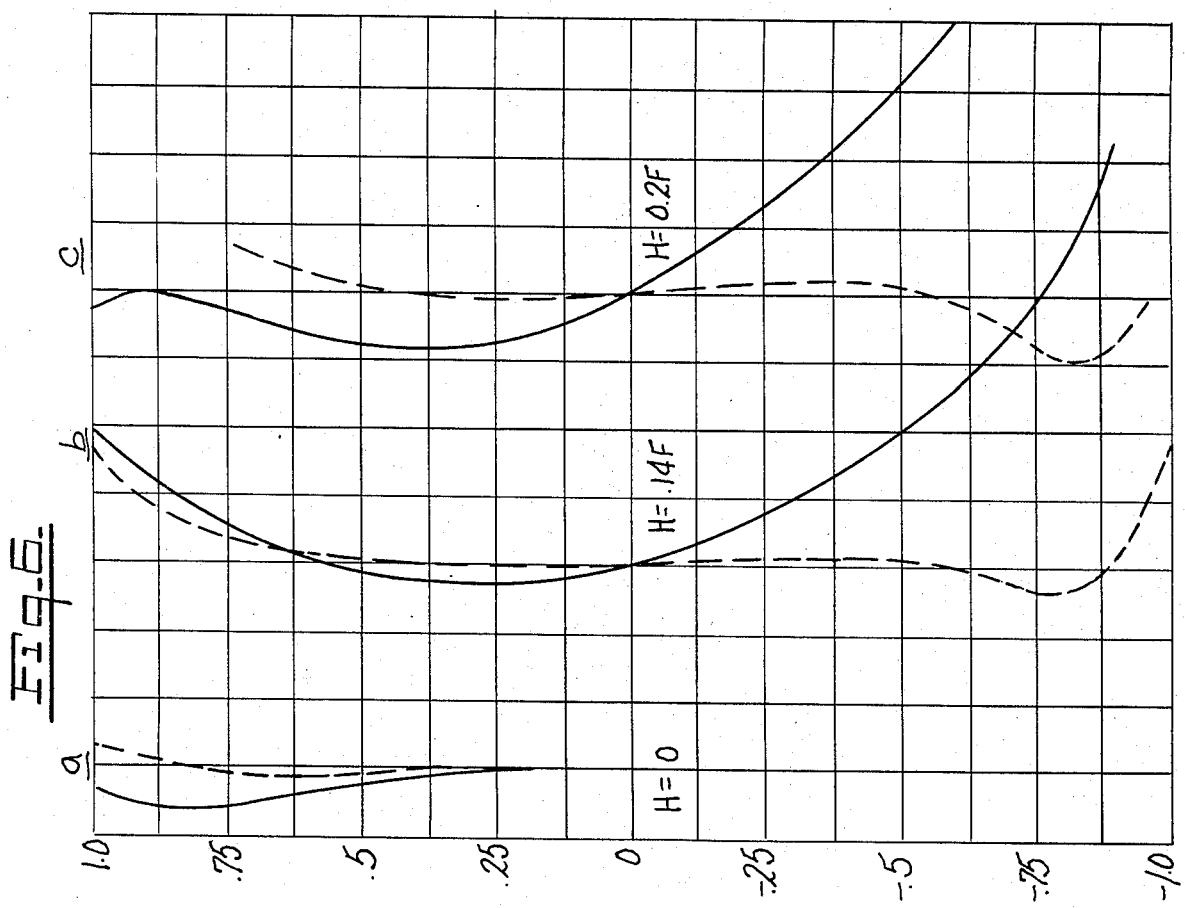
FIG. 6 is a graphical representation in aberration in the lenses of FIGS. 1 and 2 due to tangential rays with the object at 10 focal lengths for different object heights.

With the object at infinity there is only slight improvement in lateral aberration correction through the use of the corrector elements. FIGS. 5 and 6 show the same comparison with the object at ten focal lengths or 1,000mm. FIG. 5 represents a comparison of the aberration due to sagittal rays and FIG. 6 represents a comparison of the aberration due to tangential rays.

FIGS. 5 and 6 show that the use of the corrector group, when the object is focused closely provides substantial off-axis aberration correction and clearly exemplifies the improvement due to use of the invention.

It will further be seen that the provision of the aberration correction element in the lenses of FIG. 2 does not increase the overall length of the lens with respect to that of FIG. 1. The telephoto ratios are essentially identical.

FIG. 7 shows a 100mm f/1.9, lens scaled for a 24 × 36mm image frame. The data of this lens is set forth in Table III.

TABLE III

| Lens | | Radius | Axial Distance Between Surfaces | $N_d$ | $V_d$ |
|---|---|---|---|---|---|
| L1 | $R_1 =$ | 59.584 | | | |
|  |  |  | 13.120 | 1.713 | 53.9 |
|  | $R_2 =$ | 606.100 | | | |
|  |  |  | .100 | | |
| L2 | $R_3 =$ | 44.062 | | | |
|  |  |  | 5.901 | 1.805 | 25.4 |
|  | $R_4 =$ | 29.686 | | | |
|  |  |  | 0 | | |
|  | $R_5 =$ | 29.686 | | | |
| L3 |  |  | 12.165 | 1.743 | 49.3 |
|  | $R_6 =$ | 50.109 | | | |
|  |  |  | 3.800 | | |
|  | $R_7 =$ | −384.628 | | | |
| L4 |  |  | 2.478 | 1.720 | 29.3 |
|  | $R_8 =$ | 27.190 | | | |
|  |  |  | 15.955 | | |
|  | $R_9 =$ | 79.129 | | | |
| L5 |  |  | 10.759 | 1.743 | 49.3 |
|  | $R_{10} =$ | −25.062 | | | |
|  |  |  | 0 | | |
|  | $R_{11} =$ | −25.062 | | | |
| L6 |  |  | 3.500 | 1.640 | 60.2 |
|  | $R_{12} =$ | −209.527 | | | |
|  |  |  | .144 | | |
|  | $R_{13} =$ | 156.254 | | | |
| L7 |  |  | 3.570 | 1.650 | 39.3 |
|  | $R_{14} =$ | 34.143 | | | |
|  |  |  | 0 | | |
|  | $R_{15} =$ | 34.143 | | | |
| L8 |  |  | 7.989 | 1.532 | 49.0 |
|  | $R_{16} =$ | −718.936 | | | |
|  |  |  | 40.0 | | |
| Film Plane | | | | | |

In the lens of FIG. 7, the space between lens elements L6 and L7 varies between 0.144mm and 37.820mm for focusing from infinity to 393mm or four focal lengths.

The BFL is 40.0mm and the focal length of the corrector element comprising lens L7 and L8 is 866mm.

FIG. 8 illustrates another 100mm f/1.9 lens scaled for a 24 × 36mm image frame camera using an air spaced doublet corrector L6–L7. The data on this lens is shown on Table IV.

TABLE IV

| Lens | Radius | | Axial Distance Between Surfaces | $N_d$ | $V_d$ |
|---|---|---|---|---|---|
| L1 | $R_1 =$ | 46.7761 | 9.000 | 1.58913 | 61.3 |
| | $R_2 =$ | −1158.7859 | 0.250 | | |
| L2 | $R_3 =$ | 44.3752 | 15.792 | 1.5168 | 64.2 |
| | $R_4 =$ | 68.2001 | 3.500 | | |
| L3 | $R_5 =$ | −133.8090 | 3.000 | 1.76182 | 26.2 |
| | $R_6 =$ | 34.2235 | 19.215 | | |
| L4 | $R_7 =$ | 79.8431 | 5.777 | 1.72342 | 38.0 |
| | $R_8 =$ | −45.8030 | 3.341 | | |
| L5 | $R_9 =$ | −40.1509 | 2.700 | 1.64769 | 33.8 |
| | $R_{10}=$ | −98.8379 | 1.000 | | |
| L6 | $R_{11}=$ | 116.9509 | 3.500 | 1.74077 | 27.8 |
| | $R_{12}=$ | −67.5594 | 2.869 | | |
| L7 | $R_{13}=$ | −55.5673 | 1.600 | 1.78472 | 25.7 |
| | $R_{14}=$ | 132.8154 | 40.497 | | |
| Film Plane | | | | | |

$N_d$ is the index of refraction and $V_d$ is the Abbe number.

The back focal length of the lens is 40.5mm. The space between lens elements L5 and L6 varies between 1.000mm and 11.002mm for focusing from infinity to 1202.2mm, about 12 focal lengths or about 47 inches.

The effective focal length of the air spaced doublet corrector L6,L7, is negative (−621.39) and approaches infinity, inasmuch as the power of the doublet corrector is essentially zero.

FIG. 9 illustrates a 135mm f/2.0 lens scaled for a 24 × 36mm image frame camera using an air spaced doublet corrector L6–L7. The data on this lens is shown in Table VI.

TABLE VI

| Lens | Radius | | Axial Distance Between Surfaces | $N_d$ | $V_d$ |
|---|---|---|---|---|---|
| L1 | $R_1 =$ | 51.645 | 14.100 | 1.60729 | 59.5 |
| | $R_2 =$ | plano | .369 | | |
| L2 | $R_3 =$ | 50.030 | 11.841 | 1.5168 | 64.2 |
| | $R_4 =$ | 100.33 | 5.017 | | |
| L3 | $R_5 =$ | −233.12 | 4.050 | 1.80518 | 25.5 |
| | $R_6 =$ | 46.807 | 26.491 | | |
| L4 | $R_7 =$ | 126.394 | 5.684 | 1.71736 | 29.5 |
| | $R_8 =$ | −59.478 | 6.934 | | |
| L5 | $R_9 =$ | 037.419 | 3.645 | 1.64769 | 33.8 |
| | $R_{10}=$ | −338.400 | * | | |
| L6 | $R_{11}=$ | −144.915 | 4.725 | 1.80518 | 25.5 |
| | $R_{12}=$ | −70.159 | 3.921 | | |

TABLE VI-continued

| Lens | Radius | | Axial Distance Between Surfaces | $N_d$ | $V_d$ |
|---|---|---|---|---|---|
| L7 | $R_{13}=$ | −70.863 | 2.160 | 1.71736 | 20.5 |
| | $R_{14}=$ | −149.480 | 39.92 | | |
| Film Plane | | | | | |

$N_d$ is the index of refraction and $V_d$ is the Abbe number.

The back focal length of the lens is 39.92mm. The space between lens elements L5 and L6 varies between 1.16mm and 15.82mm for focusing from infinity to 1688mm, about 12½ focal lengths or about 66.4 inches.

The effective focal length of the corrector doublet is +1195mm.

FIG. 10 exemplifies a 90mm EFL f/1.9 macro lens scaled for a 24 × 36mm image frame. The data for this lens is set forth in Table VII.

| Lens | Radius | | Axial Distance Between Surfaces | $N_d$ | $V_d$ |
|---|---|---|---|---|---|
| L1 | $R_1 =$ | 85.85 | 5.000 | 1.678 | 55.5 |
| | $R_2 =$ | Plano | .234 | | |
| L2 | $R_3 =$ | 42.15 | 14.847 | 1.678 | 55.5 |
| | $R_4 =$ | 95.62 | 1.400 | | |
| L3 | $R_5 =$ | 406.87 | 4.200 | 1.673 | 32.2 |
| | $R_6 =$ | 28.95 | 12.635 | | |
| L4 | $R_7 =$ | −28.07 | 3.000 | 1.575 | 41.5 |
| L5 | $R_8 =$ | 74.74 | 7.000 | 1.691 | 54.7 |
| | $R_9 =$ | −39.95 | .234 | | |
| L6 | $R_{10}=$ | 200.43 | 3.605 | 1.678 | 55.5 |
| | $R_{11}=$ | −84.63 | 0.3 | | |
| L7 | $R_{12}=$ | −279.43 | 15.192 | 1.517 | 64.2 |
| | $R_{13}=$ | −61.78 | 7.954 | | |
| L8 | $R_{14}=$ | −48.45 | 3.600 | 1.517 | 64.2 |
| | $R_{15}=$ | −176.73 | 40.50 | | |
| Film Plane | | | | | |

The space between the lens elements L6 and L7 varies from 0.3 – 44.76 for focusing from infinity to 404.6mm or 4.5 EFL. The BFL is 40.5mm, and the EFL of the doublet corrector is +1250mm.

This last described lens may further be described as a macro lens because of its extreme close focusing capability. A magnification of 0.5 is achieved with excellent image quality.

The foregoing lenses are primarily designed for single lens reflex cameras, but may be scaled for other types of cameras.

All of the lenses comprise a first grouping of positive power, a second grouping of negative power having its larger optical power contribution on the image side followed by the aperture stop, a third group of positive power, and the corrector group. The aperture stop in each lens is indicated at A. This is generally known as a SONNAR type lens. This form is commonly used for lens of large relative aperture. In all cases, the disclosed lenses have relative apertures of f/2.0 or greater.

The relation of the elements to the groups for the disclosed lens is set forth below:

|         | FIG. 2 | FIG. 7   | FIG. 8 | FIG. 9 | FIG. 10  |
|---------|--------|----------|--------|--------|----------|
| Group I | L1,L2  | L1,L2,L3 | L1,L2  | L1,L2  | L1,L2    |
| Group II| L3     | L4       | L3     | L3     | L3       |
| Group III| L4,L5 | L5,L6    | L4,L5  | L4,L5  | L4,L5,L6 |
| Corrector| L6,L7 | L7,L8    | L6,L7  | L6,L7  | L7,L8    |

The ratio of the EFL of the corrector to the EFL of the overall lens is set forth below:

|         |         |
|---------|---------|
| FIG. 2  | 659.21  |
| FIG. 7  | 8.66    |
| FIG. 8  | − 6.21  |
| FIG. 9  | 8.26    |
| FIG. 10 | 13.89   |

The EFL of the corrector is at least 6 times the EFL of the lens, and has essentially zero power with respect thereto.

In all cases the EFL of the lenses is at least twice the diagonal of the image frame and the BFL is at least 0.9 of the diagonal.

In all of the lenses a doublet corrector which comprises one positive element and one negative element is used to provide the desired aberration correction. The correction group is fixed in the lens housing in relation to the film plane while the objective elements move for focusing in fixed relation to each other.

The present invention provides lenses with movable objectives while maintaining a corrector lens group in fixed relation to the film plane. With this arrangement where the power of the compensating lens is essentially zero, the lens will deliver optimum performance from infinity to closer distances heretofore unobtainable.

The corrector lens may have positive power so long as its power is essentially zero. The power is for all practical purposes essentially zero when the absolute value of the EFL of the corrector is at least six times the overall EFL of the lenses including the corrector.

Generally, the EFL of the corrector will be positive when the lens has a large relative aperture and/or the magnitude of the focusing travel is not a primary concern.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments which do not depart from the spirit and scope of the invention.

What is claimed is:

1. A lens defined substantially by the following data as scaled for a 24 × 36mm image frame:

| Lens | Radius | | Axial Distance Between Surfaces | $N_d$ | $V_d$ |
|------|--------|---|----|-------|-------|
| L1 | $R_1 =$ | 44.903 | | | |
|    |         |        | 9.000 | 1.589 | 61.0 |
|    | $R_2 =$ | 1037.300 | | | |
|    |         |        | .250 | | |
| L2 | $R_3 =$ | 41.385 | | | |
|    |         |        | 14.284 | 1.516 | 64.0 |
|    | $R_4 =$ | 63.742 | | | |
|    |         |        | 3.500 | | |
|    | $R_5 =$ | −149.9080 | | | |
| L3 |         |        | 3.000 | 1.755 | 27.5 |
|    | $R_6 =$ | 31.213 | | | |
|    |         |        | 19.599 | | |
|    | $R_7 =$ | 80.786 | | | |
| L4 |         |        | 5.777 | 1.750 | 35.0 |
|    | $R_8 =$ | −47.302 | | | |
|    |         |        | 4.543 | | |
|    | $R_9 =$ | −42.907 | | | |
| L5 |         |        | 2.700 | 1.755 | 27.5 |
|    | $R_{10}=$ | −120.985 | | | |
|    |         |        | 1.000 | | |
|    | $R_{11}=$ | 119.884 | | | |
| L6 |         |        | 3.500 | 1.740 | 28.2 |
|    | $R_{12}=$ | −71.346 | | | |
|    |         |        | 2.436 | | |
|    | $R_{13}=$ | −61.984 | | | |
| L7 |         |        | 1.600 | 1.785 | 25.6 |
|    | $R_{14}=$ | 166.988 | | | |
|    |         |        | 40.5 | | | where $N_d$ is the index of refraction, $V_d$ is the Abbe number, L1-L7 are the lens elements from the object end to the image end, R1-R14 are the surface radii of the lens elements, the axial distances are measured axially between lens surfaces, and the last axial distance is the back focal length.

2. A lens defined substantially by the following data as scaled for a 24 × 36mm image frame:

| Lens | Radius | | Axial Distance Between Surfaces | $N_d$ | $V_d$ |
|------|--------|---|----|-------|-------|
| L1 | $R_1 =$ | 59.584 | | | |
|    |         |        | 13.120 | 1.713 | 53.9 |
|    | $R_2 =$ | 606.100 | | | |
|    |         |        | .100 | | |
| L2 | $R_3 =$ | 44.062 | | | |
|    |         |        | 5.901 | 1.805 | 25.4 |
|    | $R_4 =$ | 29.686 | | | |
|    |         |        | 0 | | |
| L3 | $R_5$   | 29.686 | | | |
|    |         |        | 12.165 | 1.743 | 49.3 |
|    | $R_6 =$ | 50.109 | | | |
|    |         |        | 3.800 | | |
| L4 | $R_7 =$ | −384.628 | | | |
|    |         |        | 2.478 | 1.720 | 29.3 |
|    | $R_8 =$ | 27.190 | | | |
|    |         |        | 15.955 | | |
| L5 | $R_9 =$ | 79.129 | | | |
|    |         |        | 10.759 | 1.743 | 49.3 |
|    | $R_{10}=$ | −25.062 | | | |
|    |         |        | 0 | | |
| L6 | $R_{11}=$ | −25.062 | | | |
|    |         |        | 3.500 | 1.640 | 60.2 |
|    | $R_{12}=$ | −209.527 | | | |
|    |         |        | .144 | | |
| L7 | $R_{13}=$ | 156.254 | | | |
|    |         |        | 3.570 | 1.650 | 39.3 |
|    | $R_{14}=$ | 34.143 | | | |
|    |         |        | 0 | | |
| L8 | $R_{15}=$ | 34.143 | | | |
|    |         |        | 7.989 | 1.532 | 49.0 |
|    | $R_{16}=$ | −718.936 | | | |
|    |         |        | 40.0 | | | where $N_d$ is the index of refraction, $V_d$ is the Abbe number, L1-L8 are the lens elements from the object end to the image end, R1-R16 are the surface radii of the lens elements, the axial distances are measured axially between lens surfaces, and the last axial distance is the back focal length.

3. A lens defined substantially by the following data as scaled for a 24 × 36mm image frame:

| Lens | Radius | | Axial Distance Between Surfaces | $N_d$ | $V_d$ |
|---|---|---|---|---|---|
| L1 | $R_1 =$ | 46.7761 | | | |
| | | | 9.000 | 1.58913 | 61.3 |
| | $R_2 =$ | −1158.7859 | | | |
| | | | 0.250 | | |
| L2 | $R_3 =$ | 44.3752 | | | |
| | | | 15.792 | 1.5168 | 64.2 |
| | $R_4 =$ | 68.2001 | | | |
| | | | 3.500 | | |
| L3 | $R_5 =$ | −133.8090 | | | |
| | | | 3.000 | 1.76182 | 26.2 |
| | $R_6 =$ | 34.2235 | | | |
| | | | 19.215 | | |
| L4 | $R_7 =$ | 79.8431 | | | |
| | | | 5.777 | 1.72342 | 38.0 |
| | $R_8 =$ | −45.8030 | | | |
| | | | 3.341 | | |
| L5 | $R_9 =$ | −40.1509 | | | |
| | | | 2.700 | 1.64769 | 33.8 |
| | $R_{10} =$ | −98.8379 | | | |
| | | | 1.000 | | |
| L6 | $R_{11} =$ | −116.9509 | | | |
| | | | 3.500 | 1.74077 | 27.8 |
| | $R_{12} =$ | −67.5594 | | | |
| | | | 2.869 | | |
| L7 | $R_{13} =$ | −55.5673 | | | |
| | | | 1.600 | 1.78472 | 25.7 |
| | $R_{14} =$ | 132.8154 | | | |
| | | | 40.497 | | | where $N_d$ is the index if refraction, $V_d$ is the Abbe number, L1-L7 are the lens elements from the object end to the image end, R1-R14 are the surface radii of the lens elements, the axial distances are measured axially between lens surfaces, and the last axial distance is the back focal length.

4. A lens defined substantially by the following data as scaled for a 24 × 36mm image frame:

| Lens | Radius | | Axial Distance Between Surfaces | $N_d$ | $V_d$ |
|---|---|---|---|---|---|
| L1 | $R_1 =$ | 51.645 | | | |
| | | | 14.100 | 1.60729 | 59.5 |
| | $R_2 =$ | plano | | | |
| | | | .369 | | |
| L2 | $R_3 =$ | 50.030 | | | |
| | | | 11.841 | 1.5168 | 64.2 |
| | $R_4 =$ | 100.33 | | | |
| | | | 5.017 | | |
| L3 | $R_5 =$ | −233.12 | | | |
| | | | 4.050 | 1.80518 | 25.5 |
| | $R_6 =$ | 46.807 | | | |
| | | | 26.491 | | |
| L4 | $R_7 =$ | 126.394 | | | |
| | | | 5.684 | 1.71736 | 29.5 |
| | $R_8 =$ | −59.478 | | | |
| | | | 6.934 | | |
| L5 | $R_9 =$ | 037.419 | | | |
| | | | 3.645 | 1.64769 | 33.8 |
| | $R_{10} =$ | −338.400 | | | |

-continued

| Lens | Radius | | Axial Distance Between Surfaces | $N_d$ | $V_d$ |
|---|---|---|---|---|---|
| | | | 1.16 | | |
| L6 | $R_{11} =$ | −144.915 | | | |
| | | | 4.725 | 1.80518 | 25.5 |
| | $R_{12} =$ | −70.159 | | | |
| | | | 3.921 | | |
| L7 | $R_{13} =$ | −70.863 | | | |
| | | | 2.160 | 1.71736 | −20.5 |
| | $R_{14} =$ | −149.480 | | | |
| | | | 39.92 | | | where $N_d$ is the index of refraction, $V_d$ is the Abbe number, L1-L7 are the lens elements from the object end to the image end, R1-R14 are the surface radii of the lens elements, the axial distances are measured axially between lens surfaces, and the last axial distance is the back focal length.

5. A lens defined substantially by the following data as scaled for a 24 × 36mm image frame:

| Lens | Radius | | Axial Distance Between Surfaces | $N_d$ | $V_d$ |
|---|---|---|---|---|---|
| L1 | $R_1 =$ | 85.85 | | | |
| | | | 5.000 | 1.678 | 55.5 |
| | $R_2 =$ | plano | | | |
| | | | .234 | | |
| L2 | $R_3 =$ | 42.15 | | | |
| | | | 14.847 | 1.678 | 55.5 |
| | $R_4 =$ | 95.62 | | | |
| | | | 1.400 | | |
| L3 | $R_5 =$ | 406.87 | | | |
| | | | 4.200 | 1.673 | 32.2 |
| | $R_6 =$ | 28.95 | | | |
| | | | 12.635 | | |
| L4 | $R_7 =$ | −28.07 | | | |
| | | | 3.000 | 1.575 | 41.5 |
| L5 | $R_8 =$ | 74.74 | | | |
| | | | 7.000 | 1.691 | 54.7 |
| | $R_9 =$ | −39.95 | | | |
| | | | .234 | | |
| L6 | $R_{10} =$ | 200.43 | | | |
| | | | 3.605 | 1.678 | 55.5 |
| | $R_{11} =$ | −84.63 | | | |
| | | | 0.3 | | |
| L7 | $R_{12} =$ | −279.43 | | | |
| | | | 15.192 | 1.517 | 64.2 |
| | $R_{13} =$ | −61.78 | | | |
| | | | 7.954 | | |
| L8 | $R_{14} =$ | −48.45 | | | |
| | | | 3.600 | 1.517 | 64.2 |
| | $R_{15} =$ | −176.73 | | | |
| | | | 40.50 | | | where $N_d$ is the index of refraction, $V_d$ is the Abbe number, L1-L8 are the lens elememts from the object end to the image end, R1-R15 are the surface radii of the lens elements, the axial distances are measured axially between lens surfaces, and the last axial distance is the back focal length.

* * * * *